United States Patent [19]

Toda et al.

[11] Patent Number: 5,390,288
[45] Date of Patent: Feb. 14, 1995

[54] CONTROL APPARATUS FOR A SPACE ROBOT

[75] Inventors: Yoshitsugu Toda, Tsukuba; Yasushi Fukuda, Tokyo, both of Japan

[73] Assignees: Director-General of Agency of Industrial Science and Technology, Tokyo; Kabushiki Kaisha Toshiba, Kawasaki, both of Japan

[21] Appl. No.: 239,931

[22] Filed: May 9, 1994

Related U.S. Application Data

[62] Division of Ser. No. 962,110, Oct. 16, 1992, abandoned.

[30] Foreign Application Priority Data

Oct. 16, 1991 [JP] Japan .................. 3-267733

[51] Int. Cl.$^6$ ............................................ A61B 17/56
[52] U.S. Cl. ........................................ 395/93; 395/95; 395/96; 395/97; 395/98
[58] Field of Search ........................ 395/93, 98, 96, 97

[56] References Cited

U.S. PATENT DOCUMENTS 4,747,458 5/1988 Andre et al. ........................... 180/79

FOREIGN PATENT DOCUMENTS 0457688 2/1992 Japan .

OTHER PUBLICATIONS

Experimental Study of Motion Control and Trajectory Planning for a Stewart Platform Robot Manipulator C. C. Nguyen, S. S. Antrazi Z. L. Zhou C. E. Campbell Jr. IEEE Apr. 1991.
Control of Space Manipulator for Capturing a Tumbling Object Zheng Hua Luo and Yoshiyuki Sakawa IEEE/ Dec. 1990.
Proc. of the 9th Conference of the Robitics Society of Japan "Compensation Control of Free Flying Space Using Sensors", Kubota et al. Nov. 27–29, 1991 pp. 101–102.
Proc. of Dynamics and Design Conference; "Control of Flying Space Robot for Capturing Maneuver", Kubota, et al., Jul. 9–11, 1991 pp. 387–392.

Primary Examiner—Allen R. MacDonald
Assistant Examiner—Richemond Dorvil
Attorney, Agent, or Firm—Oblon, Spivak, McClelland, Maier & Neustadt

[57] ABSTRACT

A control apparatus detects the position and velocity of an artificial satellite by sensors mounted on the satellite, computes tip velocity of a manipulator on the satellite on the basis of detected information items, with considering a variation in position and attitude of the satellite, and enables the manipulator to track a target flying in space. The control apparatus sets an approach maneuver trajectory at the flying target with the use of relative position/attitude information items between a gripper and a corresponding portion of the flying target which are obtained by a proximity sensor. When the flying target is captured by the gripper on the manipulator, the control apparatus detects a force acting upon the manipulator using a force/torque sensor. The target capturing operation is performed by sending command signals to driving motors connected between the shafts of the satellite manipulator.

9 Claims, 4 Drawing Sheets

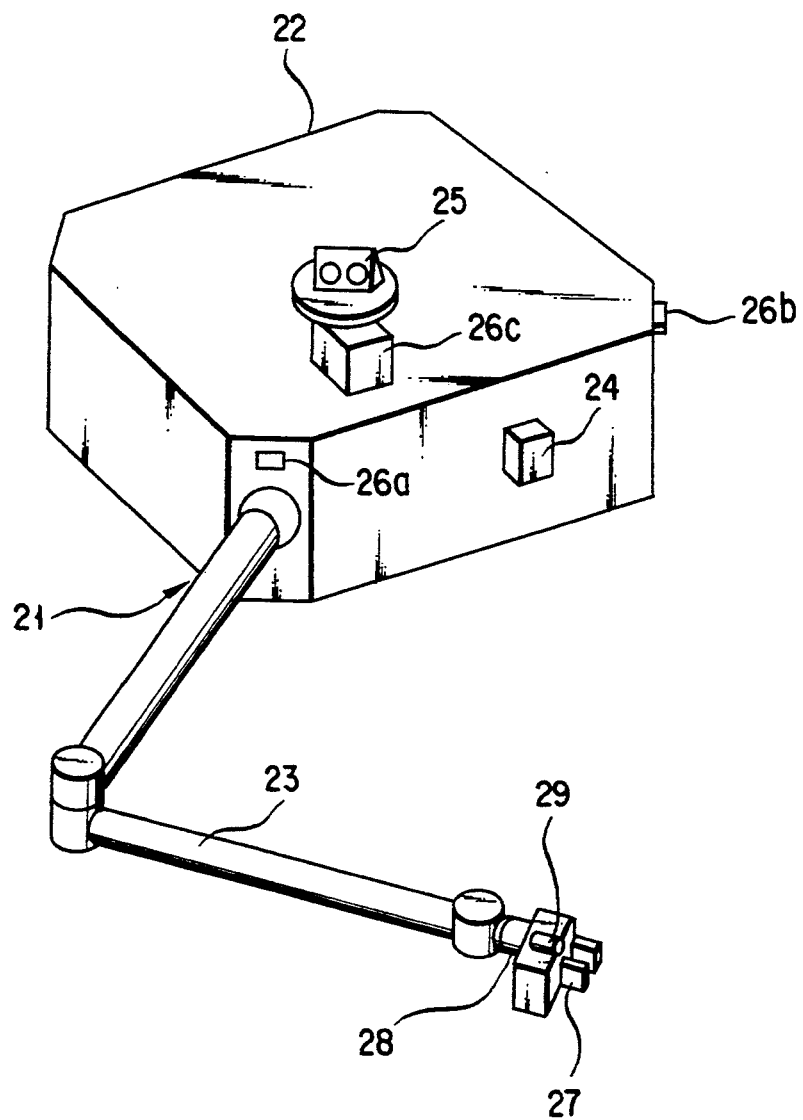
F I G. 2

CONTROL APPARATUS FOR A SPACE ROBOT

This application is a continuation-in-part of application Ser. No. 07/962,110, filed on Oct. 16, 1992, now abandoned.

BACKGROUND OF THE INVENTION

1. Field of the Invention

The present invention relates to a control apparatus for controlling a space robot for use in an assembling operation, repairing or servicing operation, etc., in a space environment.

2. Description of the Related Art

A flying target can very readily be captured by controlling a ground-based robot as well known in the art. The ground-based robot will be explained below in connection with its control system by referring to FIG. 1.

The capturing of a target by the ground-based robot will be explained below.

As shown in FIG. 1, the ground-based robot recognizes the position and attitude of the target by a visual sensor. A result of recognition is input to a manipulator trajectory generator 2 where a trajectory from a present position of a manipulator to a capturing position of the target is set. The manipulator trajectory generator 2 computes a desired position of a manipulator in the robot body coordinate ($\Sigma_C$) and delivers the sequential target position $^cPm^d$, as sequential data, to a manipulator forward end velocity generator 3 where the manipulator tip velocity command value $^cVm^d$ is found.

Then the velocity command value $^cVm^d$, together with a Jacobian matrix J found by a Jacobian matrix generator 4 with the use of a manipulator rotational angle, is supplied to a manipulator rotational velocity generator 5 where the manipulator rotational velocity $\omega c^d$ is computed. Based on a result of the computation the manipulator is moved to the target capturing position and a gripper grips or captures the target by its closing operation.

As set out above, the ground-based robot can readily capture the target.

For a space robot having a manipulator mounted on an artificial satellite, a control system adopted on the ground cannot be employed directly because the space robot on the satellite and a flying target to be captured are moved, while floating in the gravitationless space. The reason for this is as follows.

When the manipulator is operated in space, since the satellite having the base of the manipulator is oscillated in position and attitude due to a reaction force according to this operation, thus making it difficult to locate the tip of the manipulator. If the same position control system and velocity control system as those on the ground are employed upon the capturing of the flying target, by a gripper on the tip of the manipulator, which is floatingly moved in space, then the manipulator is oscillated due to a load involved and there is a possibility that an excessive load will act on the manipulator or a gripping target will be released out of the gripper of the manipulator. Further, if the gripper on the tip of the manipulator collides with the target flying in space, translational and rotational motions act on the flying target, causing the target to be moved outside an operation range of the manipulator, and hence, moved out of a capturing or gripping range.

As set out above, if the control system adopted on the ground-based robot is employed on the space robot, it is impossible to better capture or grip the target floatingly moving in a specific environment, that is, in a space environment. Therefore, there is a growing demand for a control system applicable to the space robot.

The document relating to the present invention includes Published Unexamined Japanese Patent Application 4-57683, N. Kubota et al., "Compensation Control of Free Flying Space Robot Using Sensors", Poc. of the 9th Conference of the Robotics Society of Japan, Nov. 27 to 29, 1991, pp. 101-102 and N. Kubota et al., "Control of Flying Robot for Capturing Maneuver", Proc. of Dynamics and Design Conference, Jul. 9-11, 1991, pp. 387-392. However, no practical method for operating the arm of the space robot through the utilization of the sensors is shown in the document above.

SUMMARY OF THE INVENTION

It is accordingly the object of the present invention to provide a control apparatus for a space robot which can properly capture a target flying in space.

According to the present invention, there is provided a control apparatus for controlling a space robot, mounted on an artificial satellite and having a gripper-equipped manipulator, for capturing a target flying in space and having a to-be-gripped portion, comprising:

a first sensor mounted on the satellite to detect a position and velocity of the satellite;

a second sensor mounted on the manipulator to detect a relative gripper-to-target position and attitude;

a force/torque sensor mounted on the manipulator to detect a force and torque acting on the manipulator;

first driving means for driving the manipulator so as to, after a trajectory for allowing a tip of the manipulator to track the flying target has been set based on a result of detection by the first sensor and a corresponding operation command has been generated, track the flying target by the manipulator along the trajectory in space and position the tip of the manipulator relative to the to-be-gripped portion of the flying target in consideration of a variation in position of the satellite;

second driving means for driving the manipulator so as to locate the gripper, in a position to enable the to-be-gripped portion of the target to be captured, based on a result of detection by the second sensor; and third driving means for correcting a position of the manipulator based on a result of detection by the force/torque sensor and for enabling the gripper to perform a capturing operation relative to the target in a corrected position.

When the flying target is to be captured by the space robot, the relative robot-to-target position and velocity are recognized based on a result of detection by a first sensor mounted on the satellite. After the tip of the manipulator has set a target tracking trajectory based on a result of recognition, a corresponding desired velocity command is generated and the manipulator is driven so as to track the target flying in space. A variation in position and velocity of the satellite involved by the movement of the manipulator is detected by the first sensor and the manipulator is driven so as to position the tip of the manipulator relative to the to-be-gripped portion of the flying target, while paying attention to a variation in position of the satellite.

Based on information obtained from the second sensor, the manipulator is driven so as to locate the gripper in a position to capture the to-be-gripped portion of the flying target.

Using the force/torque information items from the force/torque sensor mounted on the manipulator, the position of the manipulator is corrected and the manipulator performs a capturing maneuver operation, while reducing a vibration of the flying target caused by the contacting of the gripper with the to-be-gripped portion of the target.

As set out above, the present control apparatus for the space robot detects the position and velocity of the satellite by sensors mounted on the artificial satellite. Based on a result of detection, the manipulator tip velocity generator computes the tip velocity of the manipulator, in consideration of a variation in position and attitude of the satellite caused by the manipulator. By so doing, it is possible to perform a target tracking operation, by the manipulator, in space. Using the position-/attitude information items for the gripper relative to the to-be-gripped portion of the flying target which are obtained by the proximity sensor, the manipulator trajectory generator sets an approach maneuver track relative to the target flying in space. Upon the capturing of the target by the gripper, the force/torque sensor detects a force and torque acting upon the manipulator and, based on the detected value, the manipulator tip velocity is controlled in a way to correspond to the external forces. According to the present invention, therefore, it is possible to stably capture the target flying in space.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is an external appearance of a space robot controlled by a control apparatus according to an embodiment of the present invention;

DETAILED DESCRIPTION OF THE PREFERRED EMBODIMENTS

Figure 1:
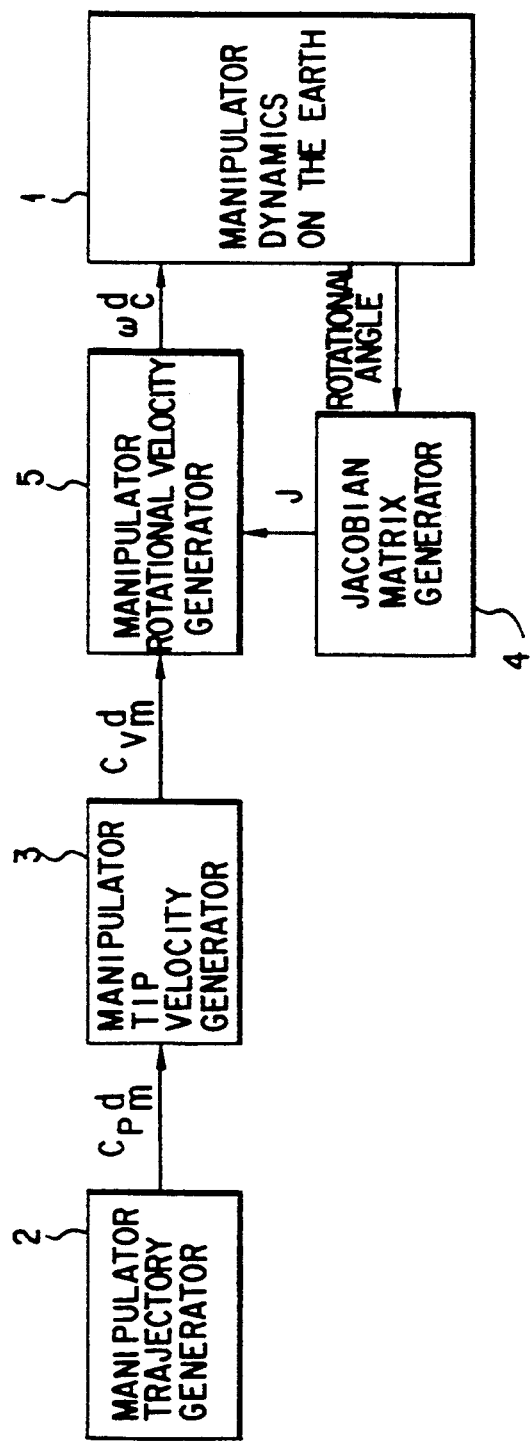
FIG. 1 is a block diagram showing a control apparatus for controlling a ground-based robot.

One embodiment of the present invention will be explained in more detail below.

FIG. 2 shows an external appearance of a space robot 21 controlled by a control apparatus according to the present invention.

The space robot 21 comprises an artificial satellite 22 and a manipulator 23 mounted on the artificial satellite 22.

The artificial satellite 22 comprises a first sensor 24 for detecting the position and velocity of the satellite, a visual sensor 25 for recognizing a relative position and velocity between a flying target (not shown) to be captured and the artificial satellite 22, and propelling units 26A to 26C for controlling the flight and attitude of the satellite 22. The manipulator 23 includes a gripper 27 mounted on its tip, a force/torque sensor 28 mounted near a gripper 27 to detect a force and torque acting on the gripper 27, and a proximity sensor (second sensor) 29 for detecting a relative position and attitude between the gripper 27 and the flying target, not shown.

Figure 3:
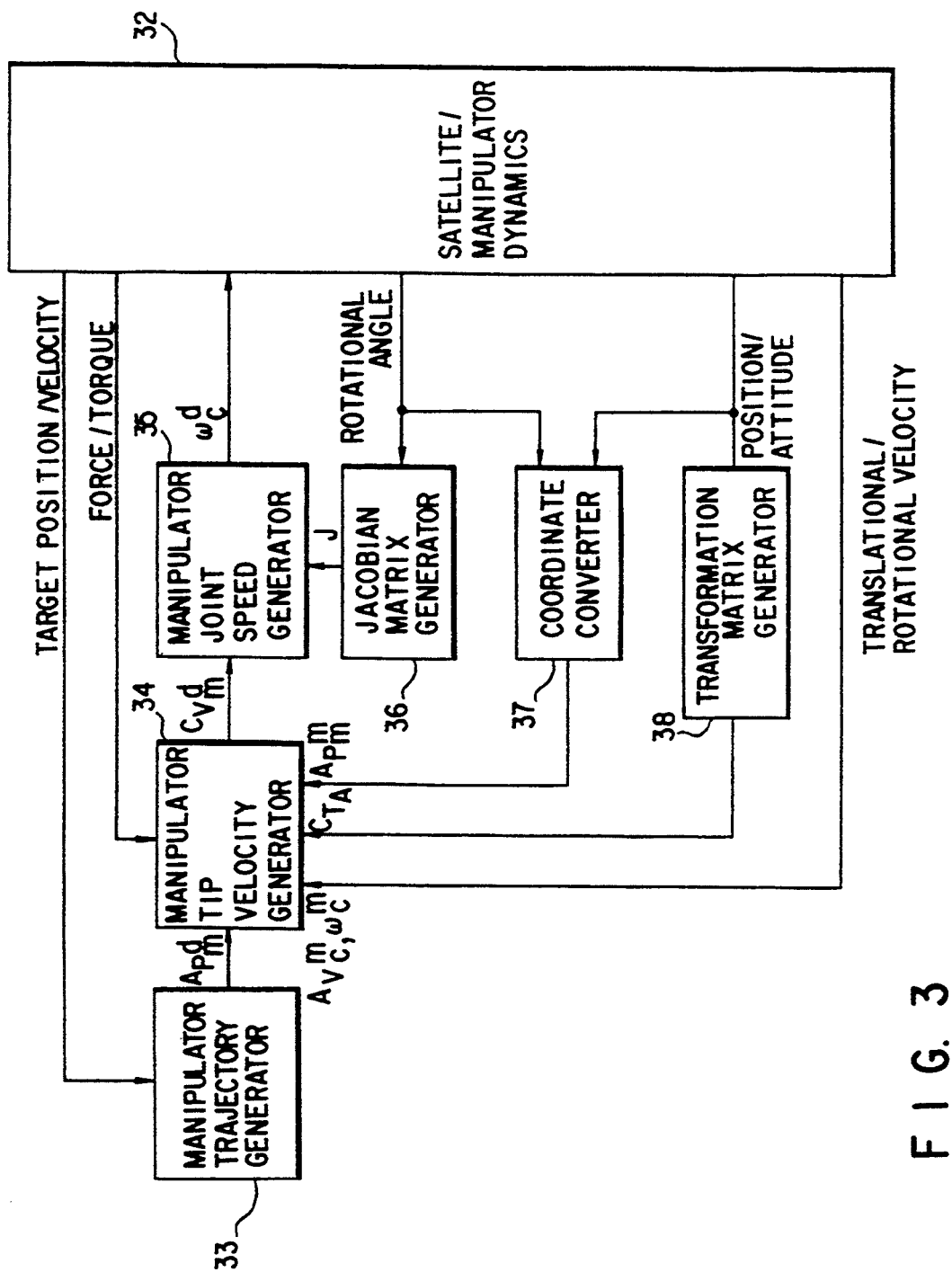
FIG. 3 is a block diagram showing a control system incorporated into the space robot.

In the satellite 22, a control system for starting by an external radio signal is connected to a satellite/manipulator dynamics 32 as shown in FIG. 3.

The control system includes a manipulator trajectory generator 33, a manipulator tip velocity generator 34, a manipulator rotational velocity generator 35, a Jacobian matrix generator 36, a coordinate converter 37 and a rotation matrix generator 38. The manipulator trajectory generator 33 sets an trajectory of the manipulator tip on the basis of the position, attitude and velocity of the flying target detected by the sensor 24 or the proximity sensor 29. The manipulator tip velocity generator 34 receives information items, such as the trajectory of the manipulator 23, force information item on the manipulator 23 and translational and rotational velocity of the satellite 22 and computes the forward velocity of the manipulator 23. The manipulator rotational velocity generator 35 computes the rotational velocity of the manipulator 23 on the basis of the tip velocity of the manipulator 23. The Jacobian matrix generator 36 generates a Jacobian matrix based on the rotational angle of the manipulator 23 and delivers it to the manipulator rotational velocity generator 35. The coordinate converter 37 receives, as data items, the rotational angle of the manipulator 23 and position and attitude information items for the satellite 22 and computes the manipulator tip position on a coordinate system defined in space. The transformation matrix generator 38 receives the satellite position and attitude information items to generate a transformation matrix between the coordinate system defined in space and the coordinate system defined on the satellite 22.

The space robot control apparatus according to the present invention will now be explained below in conjunction with the capturing of the flying target by the space robot 21.

First, the visual sensor 25 on the satellite 22 recognizes its relative position and velocity to the flying target. Based on a result of recognition, the propelling units 26A to 26C are operated to enable a flying target to enter an operation range of the manipulator on the space robot and hence the space robot 21 to be maneuvered properly.

Then the sensor 24 on the satellite 22 detects a variation in position and velocity of the satellite 22 caused by the operation of the manipulator 23. The manipulator 23 is so moved, with considering the variation in position of the satellite 22, as to locate the gripper 27 just in a position where the flying target, not shown, is gripped or captured.

The controlling of the manipulator 23 is carried out as will be set out below.

Based on trajectory from a present position of the gripper 27 to the flying target capturing position in the space, the manipulator trajectory generator 12 sets a desired position $^A P_m{}^d$ of the manipulator in a coordinate position $\Sigma_A$ defined in the space. From the desired position $^APm^d$ and the present position $^APm^m$ of the manipulator 23 in the space, the manipulator tip velocity generator 34 computes the desired velocity $^AVm^d$ of the manipulator in the inertial coordinate under a PID (proportional plus integral plus derivative) control. Using the manipulator forward velocity $^AVm^d$ computed, a translational velocity $^AVm^c$ of the satellite 22 in the coordinate system $\Sigma_A$ detected by the sensor 24 and a rotational angle velocity $\omega m^c$, the manipulator tip velocity generator 34 computes the tip velocity $^cVm^d$ of the manipulator 23 in the coordinate system $\Sigma_c$ defined on the satellite 22 by the following equation:

$$^cVm^d = c_{TA}(^AVm^d - ^AVm^c) - W\, ^cPm^m\, \omega m^c \qquad (1)$$

where $c_{TA}$: a transformation matrix for converting the coordinate system $\Sigma_c$ defined on the satellite to the coordinate system $\Sigma_A$ defined in space; and $W$: a constant conversion matrix.

Using the following equation, the manipulator rotational velocity generator 35 finds a velocity command value $\Sigma c^d$ of a respective rotational of the manipulator 23 so as to drive each shaft motor for the manipulator 23.

$$\Sigma c^d = J^{-1}\, ^cVm^d \qquad (2)$$

where, J denotes the Jacobian matrix of the manipulator. The Jacobian matrix is computed by the Jacobian matrix generator 36 with the use of the rotational angle information item of the manipulator.

After the manipulator 23 has reached the flying target capturing position, the manipulator trajectory generator 33 sets the manipulator trajectory to a target capturable position sequentially, in a way responsive to the movement of the flying target, with the use of the relative gripper-to-target position/attitude information items obtained from the proximity sensor 29 and, upon receipt of the information items from manipulator tip velocity generator 34 and manipulator rotational velocity generator 35, the respective shaft motors of the manipulator 23 are driven.

Assuming that a damper (a damping coefficient C) having a dead zone is located on the tip of the manipulator 23, the manipulator tip velocity generator 34 so sets the tip velocity $^cVm^d$ of the manipulator 23 in a way to correspond to a motion when a force F detected at the force/torque sensor 28 on the manipulator 23 acts on the damper in the case where the gripper 27 grips a corresponding portion (to-be-gripped portion) of the flying target, not shown. By so doing, it is possible to reduce an vibration of the flying target at the aforementioned corresponding portion upon contacting with the gripper 27.

That is, using force information item F detected at the force/torque sensor 28, initially set force value $F_a$ and damping coefficient C, the desired velocity of the manipulator in the robot body coordinate $^cVm^d$ of the manipulator 23 is found by equations below:

$$^cVm^d = C^{-1}(F - F_a) \qquad (3)$$

for $F > F_a$
and $$^cVm^d = 0 \qquad (4)$$

for $F \leq F_a$.

Using the $^cVm^d$ value above, the desired rotational velocity of the mainpulator $\Sigma c^d$ of each rotational of the manipulator 23 is found by the manipulator rotational velocity generator 35 and, by so doing, it is possible to drive the respective shaft motor for the manipulator 23 and finally bring the manipulator 23 into gripping engagement with the corresponding portion of the flying target.

As set out above, the relative position/velocity of the space robot 21 to the flying target to be gripped is recognized by the visual sensor 25 and the target velocity at the tip of the manipulator 23 is computed, taking into consideration a variation in the attitude of the satellite 22 involved by the operation of the manipulator 23. The tracking of the flying target is performed by positioning the tip of the manipulator 23. An approaching maneuver of the manipulator 23 to the flying target is carried out using the relative position/attitude of the gripper 27 to the corresponding portion of the flying target detected by the proximity sensor 29. A force acting between the flying target and the gripper 27 is detected by the force/torque sensor 28 upon the gripping of the target by the gripper. The manipulator 23 is controlled with the use of the detected information item, thus reducing a vibration of the target upon the gripping of the flying target. According to the space robot control apparatus of the present invention, it is possible to perform a stabler target-capturing operation.

Figure 4:
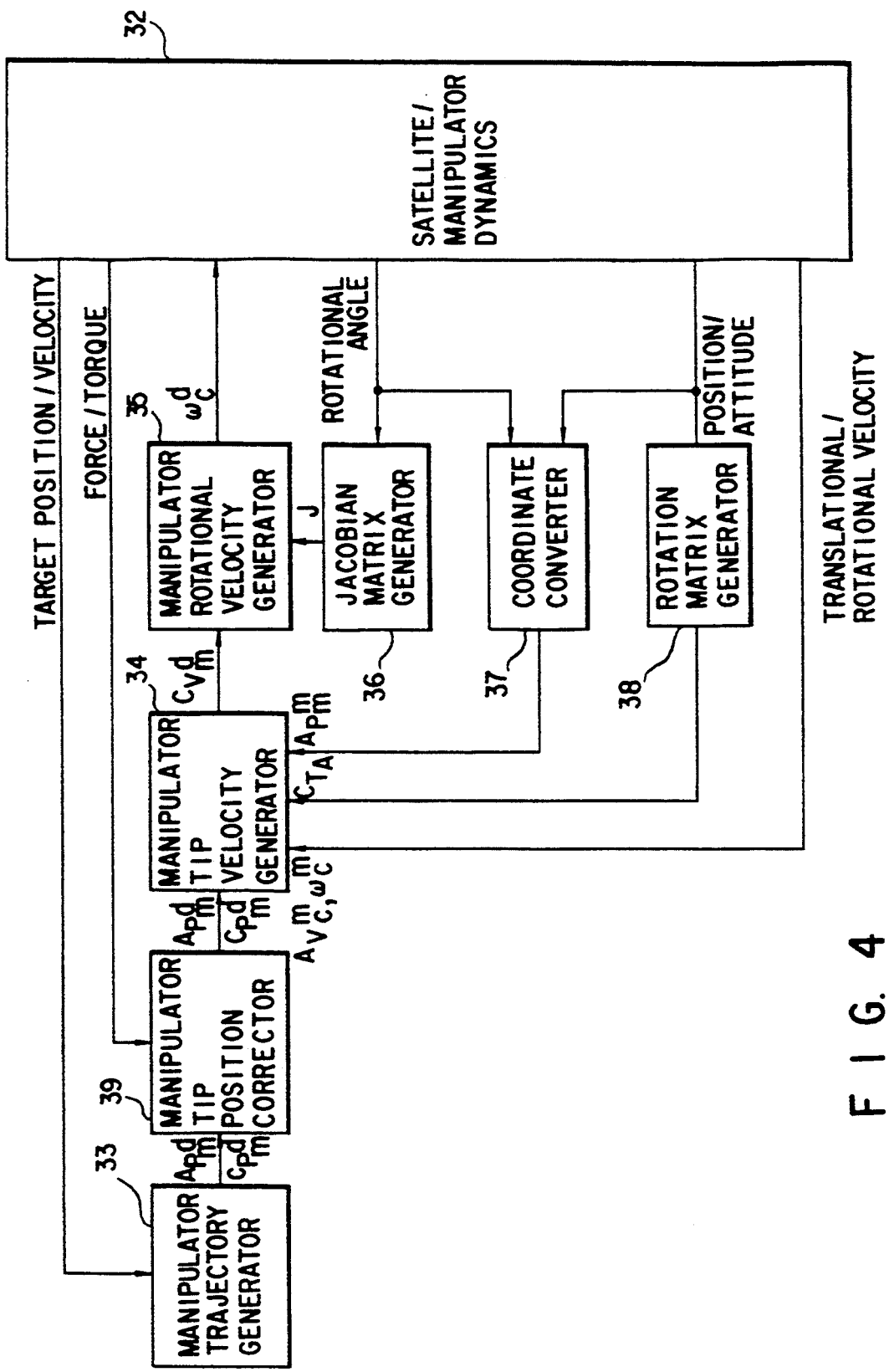
FIG. 4 is a block diagram showing a control apparatus, according to another embodiment of the present invention, which is employed for a space robot.

FIG. 4 shows a control system for a control apparatus according to another embodiment of the present invention.

In FIG. 4, the same reference numerals are employed to designate parts or elements corresponding to those shown in FIG. 3 and any duplicate explanation is, therefore, omitted for brevity's sake.

According to the embodiment, when a gripper 27 grips the corresponding portion of the flying target, not shown, in space, the position of a manipulator 23 is corrected by a manipulator tip position corrector 39 with the use of a force information item obtained from a force/torque sensor 28 so as to attenuate a vibration of the flying target involved upon the contacting of the gripper 27 with the corresponding portion of the flying target.

Assuming an inertial body (mass K) connected through a spring (spring constant K) around a sequential target position of the manipulator and damper (damping coefficient C), the manipulator tip position corrector 39 sets a modified position $^cPm^{d'}$ in a way to correspond to a motion involved when a detected force F of the force/torque sensor 28 acts upon the inertial body.

The modified position position $^cPm^{d'}$ is obtained by formulas below $$e = {^cPm^{d'}} - {^cPm^d} \qquad (5)$$

and $$M\ddot{e} + C\dot{e} + Ke = F \qquad (6)$$

Under a PID control, a manipulator tip velocity generator 34 computes the tip velocity of the manipulator 23 on the basis of the modified position $^cPm^{d'}$ and present position $^cPm^d$. Based on the tip velocity $^cVm^d$, a manipulator rotational velocity generator 35 finds a velocity command value $\Sigma c^d$ of each rotational velocity of the manipulator shafts 23 and it is thus possible to drive each shaft motor on the manipulator 23.

In the embodiment shown, the tip velocity of the manipulator 23 is computed from a detected force of the force/torque sensor 28 with the use of a dynamic model in the manipulated tip position corrector 39 and, by controlling the tip velocity of the manipulator 23 so as to correspond to the computed tip velocity of the manipulator 23, it is possible to reduce a vibration of the flying target caused on the capturing of the target by the gripper.

It is thus possible, according to the present invention, to achieve a stabler gripping or capturing operation.

Although, in the aforementioned embodiment, a control operation has been explained as being made using desired velocity of the manipulator, this can also be carried out using a desired torque of the manipulator.

The present invention is not restricted to the aforementioned embodiment and various changes or modifications of the present invention can be made without departing from the spirit and scope of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A control apparatus for controlling a space robot, mounted on an artificial satellite and having a manipulator which has an arm connected to the satellite, and has a gripper connected to the arm to capture a flying target in space having a portion to be grasped by the gripper, comprising:

a first sensor mounted on the satellite to detect a position and velocity of the satellite;

a second sensor mounted on the manipulator to detect a relative position and attitude between the gripper and the flying target;

trajectory generating means for setting a trajectory to allow the gripper to track the flying target based on a result of detection by said first sensor and generating a corresponding operation command of the arm;

a force/torque sensor mounted on the manipulator to detect a force and torque acting on the manipulator;

first driving means for driving the arm so as to track the flying target by the manipulator along the trajectory in space set by said trajectory generating means and position the gripper to the portion of the flying target in consideration of a variation in position of the satellite;

second driving means for driving the gripper so as to locate the gripper, in a position to enable the portion of the flying target to be captured, based on a result of detection by said second sensor; and third driving means for correcting a position of the manipulator based on a result of detection by said force/torque sensor and for enabling the gripper to perform a capturing operation to the flying target in a modified position.

2. The control apparatus according to claim 1, further comprising means for detecting a relative position and attitude between the flying target and the space robot.

3. The control apparatus according to claim 1, wherein said first driving means comprises means for sequentially setting a target position and tip velocity of the manipulator for predetermined coordinates fixed in space.

4. The control apparatus according to claim 1, wherein said second driving means comprises means for sequentially setting a trajectory of the gripper to a position capable of capturing the flying target in a manner corresponding to a movement of the flying target.

5. The control apparatus according to claim 1, wherein said third driving means comprises means for setting a tip velocity of the manipulator to correspond to a motion involved when a detected force of said force/torque sensor acts upon the flying target.

6. The control apparatus according to claim 1, wherein said third driving means comprises means for setting a target position of the manipulator sequentially to correspond to a motion involved when a detected force of said force/torque sensor acts upon the flying target.

7. A control apparatus for controlling a space robot, mounted on an artificial satellite having an arm-like manipulator with joints including a robot gripper, for capturing a target in space, the target having a gripping portion, comprising:

a position and velocity sensor for generating a first signal representing the position and velocity of the space robot relative to the target;

a proximity sensor mounted on the manipulator for generating a second signal representing position, velocity and attitude of the robot gripper relative to the gripping portion of the target;

a manipulator trajectory generator for generating desired position signals ($Apm^d$) for the manipulator by processing the first signal when the robot gripper is substantially distant from the gripping portion of the target, and for generating desired position signals ($Apm^d$) for the manipulator by processing the second signal when the robot gripper is sufficiently close to a gripping position of the target;

means for correcting a variation in position of the satellite due to movement of the manipulator;

a force torque sensor for generating a third signal representing a force and torque of the gripping portion of the target on the manipulator of the robot when the target is grabbed and representing the force and the torque exerted on the manipulator when the manipulator is moved; and a manipulator tip velocity generator for generating robot manipulator velocity signals ($Cvm^d$), by processing the desired position signals ($Apm^d$), translational velocity ($Avm^c$) of the target, rotational velocity ($\omega m^c$) of the target, the third signal, a transformation matrix ($CT_A$) which converts a coordinate system of the satellite ($\Sigma_A$) and a present position ($Apm^m$) of the manipulator.

8. A control apparatus according to claim 7, further comprising:

a manipulator joint speed generator for generating velocity command values ($\Sigma c^a$) which drive a shaft motor located on one of said joints of the manipulator.

9. A control apparatus according to claim 8 wherein the manipulator tip velocity generator generates the robot manipulator velocity signals ($Cvm^d$) using the equation:

$$Cvm^d = CT_A(Avm^d - Avm^c) - W\,Cpm^m\,\omega m^c,$$

where W is a constant conversion matrix.

* * * * *

UNITED STATES PATENT AND TRADEMARK OFFICE
CERTIFICATE OF CORRECTION

PATENT NO. : 5,390,288
DATED : February 14, 1995
INVENTOR(S) : Yoshitsugu TODA, et al.

It is certified that error appears in the above-indentified patent and that said Letters Patent is hereby corrected as shown below:

On the title page, Item [62], the Related U.S. Application Data should read:

--Continuation of Ser. No. 962,110, Oct. 16, 1992, abandoned.--

Signed and Sealed this

Thirteenth Day of June, 1995

*Attest:*

BRUCE LEHMAN

*Attesting Officer*     *Commissioner of Patents and Trademarks*